United States Patent [19]
Crete

[11] 3,830,168
[45] Aug. 20, 1974

[54] TRIPOD SHELF

[76] Inventor: Richard C. Crete, 16 S. School St., Lodi, Calif. 95240

[22] Filed: Aug. 3, 1972

[21] Appl. No.: 277,515

[52] U.S. Cl. ............................................. 108/50
[51] Int. Cl. ...................... A47b 35/00, A47b 83/00
[58] Field of Search ...... 108/50; 248/122, 238, 168, 248/169

[56] References Cited
UNITED STATES PATENTS

| 539,483 | 5/1895 | Murphy | 248/238 |
| 1,906,275 | 5/1933 | Kramer | 248/238 |
| 2,485,685 | 10/1949 | Armstrong | 248/238 X |
| 2,831,583 | 4/1958 | Wright et al. | 108/50 X |
| 2,572,205 | 10/1951 | Shanks | 248/188.6 |
| 2,938,450 | 5/1960 | Carpenter et al. | 108/50 X |
| 3,126,186 | 3/1964 | Halligan | 248/122 |

*Primary Examiner*—Paul R. Gilliam

[57] ABSTRACT

A support for use on a studio tripod for studio and television cameras providing one or more shelves for holding articles used by the photographer including a video recorder, which support has leg-engaging elements movable from an elevated position free from one or more adjacent pairs of legs to a lowered position firmly engageable with such legs and in holding relation with said legs under the influence of gravity free from the use of bolts or screws, and which support is quickly removable upon lifting the support to said elevated position.

4 Claims, 6 Drawing Figures

PATENTED AUG 20 1974 3,830,168
FIG. 1
FIG. 2
FIG. 3
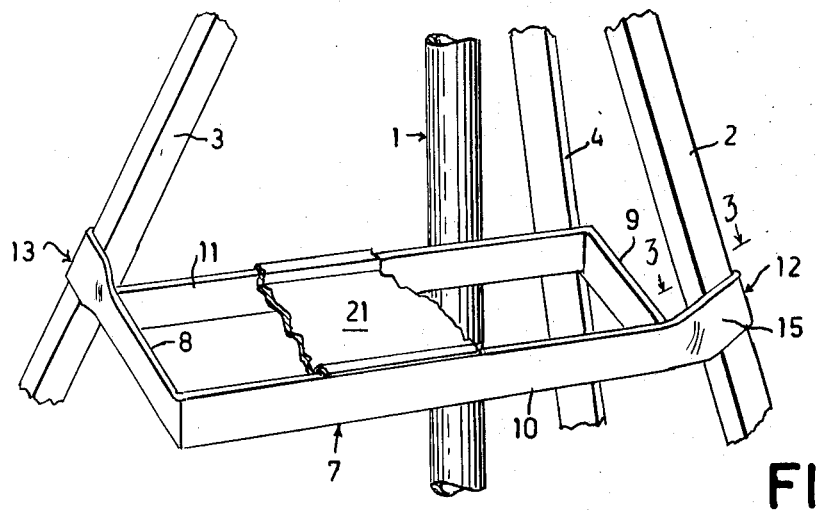
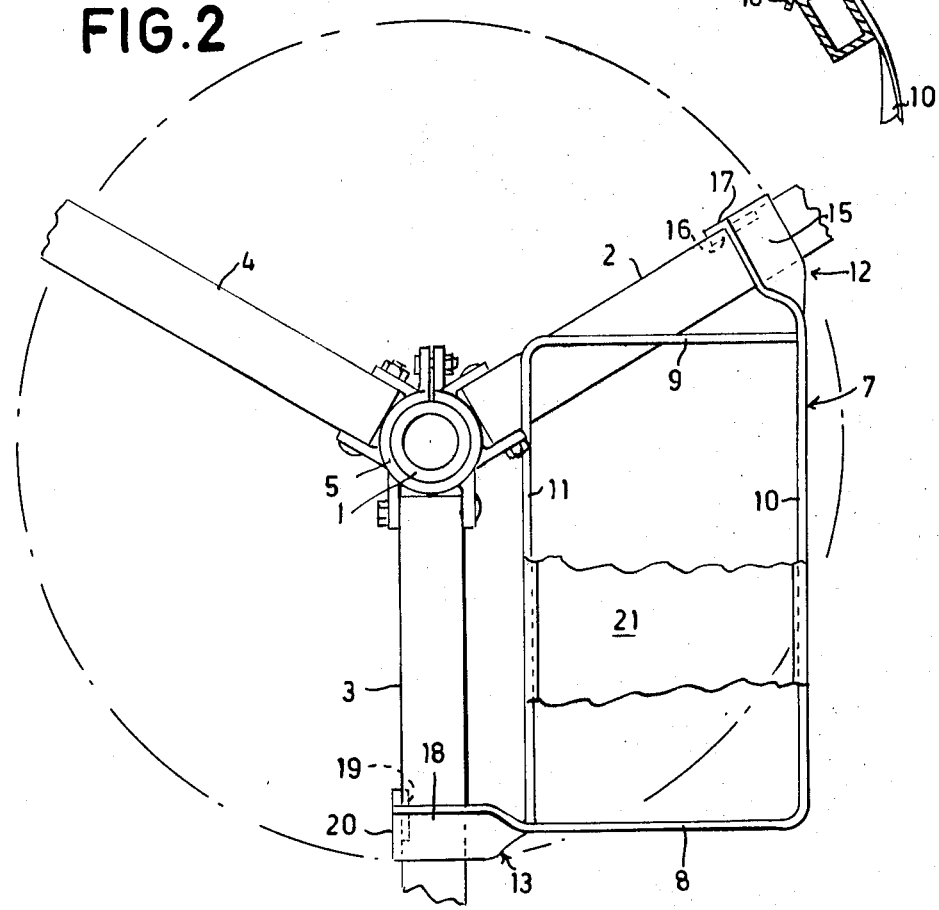

TRIPOD SHELF

SUMMARY

In professional photographic studios studio tripods support studio cameras and at times they support television cameras.

Usually the photographer, or operator, has occasion to use articles in the operation of the camera that should be conveniently accessible. In the case of television cameras, a tape recorder and monitor should be closely associated with the camera.

Heretofore the operator may attempt to carry required elements or accessories in pockets or in his hand, and it is not unusual for him to carry an item in his mouth.

Such expedients are awkward, and frequently result in dropping the held articles, causing injury or breakage; and the expedient of providing a table or the like on which the articles may be placed not only takes up valuable space but also results in a waste of time as the table may not be in a position for quick access to the operator at the camera when the article is needed.

In the case of a television camera being supported on a tripod, as well as when a studio camera is so supported, rigidity of the legs of the tripod is highly desirable.

In viewing a conventional studio tripod set up for a camera from a position centrally above the latter, it is apparent that the major portion of the space between adjacent legs, and within a horizontal circle along which said legs are positioned, is wasted.

One of the objects of the present invention is the provision of a support for photographic equipment, adjuncts, or accessories, adapted to be quickly supported on the legs of a tripod, the major portion of which support is in the space now wasted, and which support is adapted to support the tape recorder or monitor for the television camera that may be supported by said tripod.

Another object of the invention is the provision of a plurality of supports or shelves adapted to be quickly supported on the legs of a studio tripod without the use of movable set screws or clamps for engaging the legs.

Another object of the invention is the provision of means quickly positioned on the legs of a tripod, and quickly removable therefrom adapted for supporting the tape recorder and monitor where a television camera is supported on the upper end of the tripod, or for supporting other articles used by the photographer in taking pictures.

A still further object of the invention is the provision of a horizontal, planar support having means thereon for releasable engagement with one or more adjacent pairs of legs on a tripod, free from the use of set screws, bolts or clamps, and which support not only braces the legs of the tripod but may be readily lifted from the legs at any time to permit collapse of the legs.

Other objects and advantages will appear in the description and drawings.

DESCRIPTION OF DRAWINGS

FIG. 1 is a fragmentary perspective view of a shelf supported on tripod legs.

FIG. 2 is an enlarged fragmentary top plan view of a tripod with a shelf supported thereon.

FIG. 3 is a fragmentary cross-sectional view along line 3—3 of FIG. 2.

DESCRIPTION OF THE INVENTION

Figure 5:
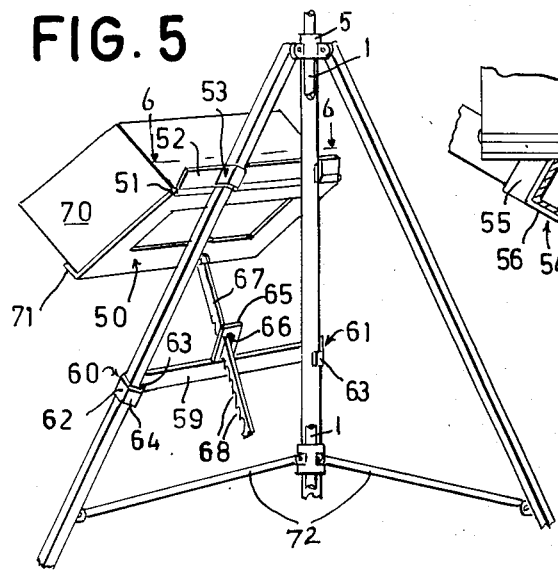
FIG. 5 is a reduced size perspective view of a modification of the shelf of FIGS. 1, 2 as seen on a tripod.

Standard studio tripods vary in details according to the make and model, but common to virtually all is the provision of three equally spaced legs pivotally connected at their upper ends to a collar that, in turn, is releasably clamped to a central vertical post that carries a camera supporting head, and the lower ends of the legs are held in expanded position by rods respectively pivotally connected at one of their ends to each leg and at their opposite ends to a collar that is slidable on, but releasably clamped to, said central post when the legs are spread or collapsed (FIG. 5).

Figure 4:
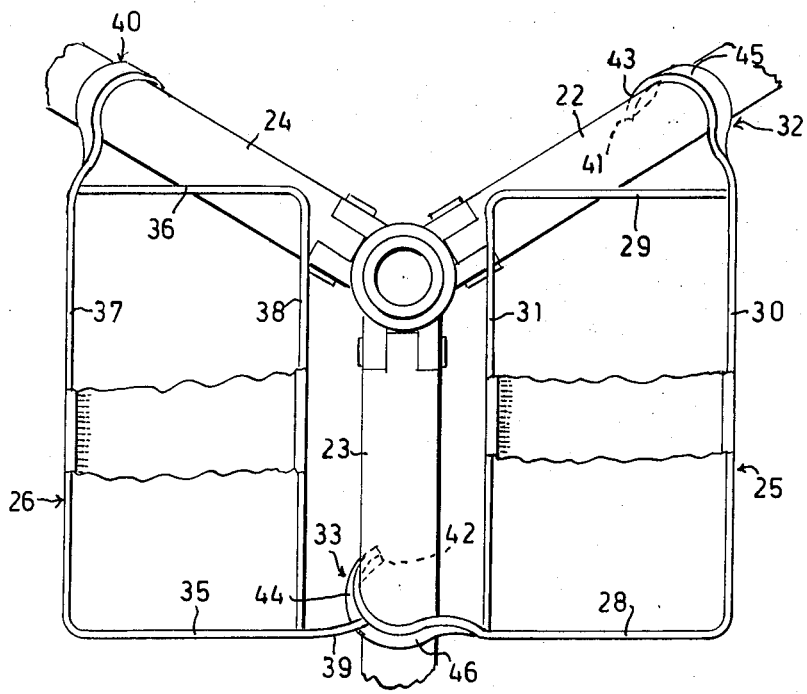
FIG. 4 is a modified top plan view, showing a pair of connected shelves supported on a tripod, the legs being in cross section and cylindrical, in this instance.

In the present invention the central vertical post of a standard tripod is indicated at 1 (FIGS. 1, 2) and the spread legs at 2, 3, 4, with the latter pivotally connected at their upper ends to a split collar 5 (FIG. 2). This collar, in turn, is releasably clamped to post 1, which may be tubular or solid. The legs in FIGS. 1–3 and 5 are tubular and rectangular in cross-sectional contour, but they may be cylindrical as shown in FIG. 4.

A horizontally disposed shelf, generally designated 7 is adapted to be releasably supported on any pair of the legs, but being shown as supported on legs 2, 3 in FIGS. 1, 2.

Shelf 7 comprises an oblong frame having opposed ends 8, 9 and opposed sides 10, 11. These frame members 8–11 may be metal strips having their sides vertical, and at two of the diagonally opposite corners of the frame, the side frame member 10 and the end frame member 8 project at 12, 13 beyond the junctions between frame members 9, 10 and between frame members 8, 11. Said projections, being extensions of the strips or frame members 8, 10 may each be considered as being a strip projecting from the shelf 7 at two of its corners.

Each projection is formed to provide a channel-like portion. One side or flange 15 of channel 12 is in angular extension of the side 10 of the frame 7 and is adapted to extend across and to engage the radially outwardly facing surface of one of the legs of the tripod relative to central post 1, and the side or flange 16 of the channel opposite to side 15 is relatively narrow and is adapted to extend partially across the radially inwardly facing side of the same leg relative to the central axis of said tripod, while the flange 17 extends across outwardly facing lateral surface of the leg that faces away from the shelf 7 generally toward the third leg of the tripod. The leg 2 of the tripod is the one that is shown in the channel member or projection 12, and the leg 3 of the tripod is shown in projection 13.

The projection 13 (FIGS. 1, 2) extends substantially straight from the end frame member 9. Otherwise the channel 13 is the same in structure as channel 12, having a narrow flange 19 opposite to flange 18 and a web 20 extending across the side of leg 3 that faces away from the shelf 7.

The channel strips or members 12, 13 are twisted relative to the frame strips 9, 10 so that the flanges 15, 18 have substantially the same inclination as the outer surfaces of the spread legs 2, 3.

The open sides of the channel members 12, 13 face inwardly and generally toward the space between the legs 2, 3 and the space between flanges 15, 16 and between flanges 18, 19 is sufficient to admit the legs 2, 3. As seen in FIG. 1, the legs 2, 3 extend convergently upwardly from the channels 12, 13 and there is no obstacle to upward movement of the shelf 7 and the channel projections 12, 13 hence the shelf is quickly clear of the legs 2, 3 upon such upward movement. However, the spacing between the channel members 12, 13 is such that they will wedgedly engage the legs at a predetermined level along the latter where the spacing between the respective adjacent pairs of legs is the same as the spacing between the projections 12, 13.

As best seen in FIG. 2, these points of engagement between said legs and the projections are at points along a horizontal circle coaxial with post 1 and the central vertical axis of the tripod, and the positioning of the shelf supporting channel members at diagonally opposite corners of the shelf results in supporting substantially the entire shelf within the space between the legs and within said circle. The legs including the conventional telescoping extensions thereon (not shown), extend at their lower ends to the floor and to points that are on a circle concentric with and spaced outside the circle 20 and within which the entire frame will be positioned.

As seen in FIGS. 1, 2 the shelf 7 extends from legs 2, 3 inwardly so that one end of the shelf is adjacent one side of the central axis of the tripod.

Shelf 7 may be provided with a fixed or removable planar pan or top 21 on which articles may be positioned and where a television camera is on the tripod a monitor and video recorder may be supported on separate shelves on said tripod. In some instances a tripod itself with shelves thereon is used for supporting equipment employed in video and photographic work since the tripods are mounted on casters enabling mobility.

FIG. 4 shows a pair of shelves 25, 26 supported on a tripod having cylindrical legs 22, 23, 24. Shelf 25 generally corresponds to shelf 7, having end frame members 28, 29 corresponding to members 8, 9, and side frame members 30, 31 corresponding to frame members 10, 11.

The projection 32 is an extension of the side strip or frame member 30 and is of channel shape conforming to the cylindrical contour of leg 22 while projection 33 is an extension of the end frame member 28 and is also of cylindrical contour, instead of the rectangular cross-sectional contour of the legs of FIGS. 1-3. The open sides of the projections 32, 33 are adapted to receive the legs 22, 23 and said projections are twisted relative to the shelf 25 to provide approximately the same degree of inclination relative to vertical as that of the legs 22, 23.

Shelf 26 has ends 35, 36 that correspond to ends 8, 9 and 28, 29 and sides 37, 38 that correspond to sides 10, 11 and 30, 31, however, a short extension 39 of the end frame member 35 connects the end frame member 35 with the projection 33, the end frame members 28, 35 being in longitudinal alignment.

The side frame member 37 has a channel extension or projection 40 that is adapted to be supported against the leg 24. The side frame members 37, 38 are parallel with the frame members 31, 20 and shelf 26 is at the opposite side of the vertical central axis of the tripod frame shelf 25.

The terminal end portions 41, 42 of the channels 32, 33 extend to the sides of legs 22, 23 opposite to the commencements of the arcuate contour of the projections hence the terminal end portions 41, 42 provide sides of the channels corresponding in function to flanges 16, 19 of the channels 12, 13, while the webs 43, 44 of channel projections 32, 33 correspond in function and positions to the webs 17, 19 and portions 45, 46 correspond to flanges 15, 18.

The sides or portions 41, 42 of channel portions 32, 43 cooperate with the remainders of said channel members and with the projection 40 to enable the shelves to carry substantial weights, yet upon upward movement of the shelves, the latter are quickly free of the legs. Obviously a single shelf having the end projections 32, 33 may be used, although the added projection 40 increases the stability of the legs.

The shelf 50 in FIGS. 5, 7 is hinged at 51 to a horizontal strip 52 that, in turn, carries projections generally designated 53, 54 that are rigid with and coact with strip 52 to provide channel members that substantially correspond to members 12, 13.

One flange 55 of each channel projection 54, 55 corresponds to flanges 15, 18 of projections 12, 13 and web 56 corresponds to webs 17, 20 while the narrow flanges 57 correspond to each of the flanges 16, 19.

A lower strip 59 corresponding to but longer than strip 51 has its end portions 60, 61 bent and inclined to provide leg receiving channel portions each having flanges 62, 63 corresponding to flanges 15, 16 and 18, 20 of channel portions 12, 13. A web 62 on each channel portion 60, 61 corresponds to web 17, 20 on each channel 12, 13.

Midway between the ends of the strip 59 is an upward projection 65 is provided with a slot 66 through which extends an adjustable brace 67. One end of the brace is pivotally connected to shelf 50 along the outer edge of the latter. The under surface of the brace formed with a plurality or row of downwardly opening notches 68 each of which is adapted to receive the upper edge of strip 59 when the latter is supported on a pair of legs of the tripod. The shelf 50 may be supported in any angle relative to horizontal or may be supported vertically.

Normally said shelf 50 will be supported at a substantially higher level on the tripod than shelves 7 or shelves 25, 26 hence may be used in addition to said shelves 7, 25, 26, and being higher the shelf 50 will normally be within the upwardly projected area of a circle along which the lower ends of the legs of the tripod extend.

Figure 6:
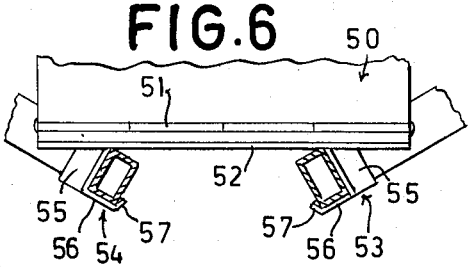
FIG. 6 is a slightly enlarged, cross-sectional view along line 6—6 of FIG. 5.

A video recorder 70 is indicated in FIG. 6 on shelf 50 and the shelf is in inclined position relative to horizontal with a ledge 71 along its lower edge to prevent the recorder from sliding off the shelf.

The arrangement of the channel projections in FIGS. 1-4 at diagonally opposite corners of the respective shelves provides a rigid, strong support for relatively heavy video equipment which, at times, may be in excess of sixty pounds on one shelf. Whatever is carried on the shelves is instantly accessible to the operator wherever the tripod is moved, and the shelves may be quickly removed, or their positions changed to new conditions, without the use of clamps, set screws, etc., that prevent changing the positions of the shelves or their removal, without loosening the clamps or screws, or manipulating the tripod. Furthermore the use of clamps and the like many times results in equipment being damaged by accidental loosening of the screws or clamps, an occurrence impossible with the present invention.

The wedging action of the legs of the tripod and the channel portions on the shelves has a noticeable stabilizing effect on the legs inasmuch as the load on the shelves, including the latter, positively hold the legs stable against detrimental vibration. The lower ends of the legs are rigidly held apart by rods 72 that are on conventional studio tripods such as used in all forms of the shelves herein described.

In its broadest aspect, the invention may be said to be a shelf for supporting articles thereon, which shelf has supporting means thereon that are horizontally spaced a predetermined distance substantially equal to the horizontal distance between each adjacent pair of legs of the tripod, at a level intermediate the upper and lower ends of the legs. And each of said supporting means includes a leg-engaging portion, such as at 15 and 18 (FIG. 2) or 45, 46 (FIG. 4) or 56 (FIG. 6) that are adapted to frictionally engage the radially outwardly facing surface of each leg of an adjacent pair relative to the vertical axis of the tripod at the aforesaid level. Stationary means rigid with each of said portions, such as the walls 16, 17–18, 19 (FIG. 2), 41, 43–42, 44 (FIG. 4) and 55, 57 (FIG. 6) are adapted to frictionally engage the leg of an adjacent pair of holding said portions and the shelf with which they are connected against downward movement relative to said legs while permitting free lifting of said shelf and its supporting means to a released position spaced above said level and free from said legs.

I claim:

1. An article support for use on a conventional, standing, photographers' studio tripod having three equally spaced legs around and equally spaced from a central vertical axis and which legs are in spread position correspondingly slanted outwardly from their upper ends in a downward direction and are held in said spread position, comprising:
   a. a shelf for supporting articles thereon;
   b. shelf supporting means on said shelf spaced horizontally a predetermined distance substantially equal to the horizontal distance between each adjacent pair of said legs at a level intermediate the upper and lower ends of said legs;
   c. each of said shelf supporting means including a leg-engaging portion adapted to extend transversely across the radially outwardly facing surface of one of an adjacent pair of said legs ralative to said axis at said level;
   d. means integral with said portions and stationary relative thereto, for frictionally engaging the respective legs of an adjacent pair thereof for holding said portions and the shelf connected therewith against downward movement relative to said legs below said level while permitting free lifting of said shelf supporting means including said portions and said shelf to an elevated position free from engagement of said shelf supporting means with said legs, when said shelf supporting means are in shelf supporting positions on said pair of legs;
   e. said shelf being rectangular, and said shelf supporting means being rigid with said shelf at two diagonally disposed corners of the latter only with the major part of said shelf disposed within the outline of a circle coaxial with said axis and extending through said shelf supporting means at said level.

2. In a shelf support as defined in claim 1:
   f. said shelf being a first shelf extending past and adjacent one side of said vertical axis when supported on said legs at said level;
   g. a second shelf similar to said first shelf connected therewith and spaced therefrom for extending past and adjacent the opposite side of said vertical axis when said first shelf is supported on said pair of legs;
   h. one of said shelf supporting means being secured to said second shelf at one of its diagonally opposite corners; and
   i. means on said second shelf at the corner thereof diagonally opposite to said one of said shelf supporting means for engaging the outer radially facing surface of the third leg of said tripod when said first shelf is supported on said pair of legs at said level.

3. A load support adapted to be supported on two only of the divergently downwardly extending legs of a tripod for supporting a load thereon for free upward removal of said support from said legs, comprising:
   a. a horizontally disposed shelf of substantially rectangular outline;
   b. a channel-like leg engaging member rigid with said shelf at each of two of its corners to provide a pair of said members;
   c. said pair of members having approximately opposedly facing laterally directed open sides for receiving said pair of legs through said open sides for engagement with said legs upon downward movement of said shelf from an elevated position between said pair of legs to a load-supporting position on the latter;
   d. said channel-like members being closely adjacent and outwardly of two only of the diagonally opposite corners of said shelf whereby the load supporting area on said shelf will be at opposite sides of a straight line extending through said two diagonally opposite corners and to the other two diagonally opposite corners to approximately balance the weight of the load at said opposite sides when said shelf is supported by said pair of legs.

4. In a load support as defined in claim 1:
   e. said shelf being oblong in outline whereby one of said other of said diagonal opposite corners will be positioned adjacent the vertical axis of said tripod when said shelf is supported on said pair of legs with a substantial portion adjacent the vertical axis of the tripod when said shelf is supported on the latter.

* * * * *